United States Patent
Pedeville et al.

(10) Patent No.: US 10,971,044 B2
(45) Date of Patent: Apr. 6, 2021

(54) METHODS AND SYSTEMS FOR MEASURING ELECTRONIC VISUAL DISPLAYS USING FRACTIONAL PIXELS

(71) Applicant: Radiant Vision Systems, LLC, Redmond, WA (US)

(72) Inventors: Gary Robert Pedeville, Shanghai (CN); Joshua Hatley Rouse, Bozeman, MT (US)

(73) Assignee: Radiant Vision Systems, LLC, Redmond, WA (US)

( * ) Notice: Subject to any disclaimer, the term of this patent is extended or adjusted under 35 U.S.C. 154(b) by 0 days.

(21) Appl. No.: 16/641,405

(22) PCT Filed: Aug. 13, 2018

(86) PCT No.: PCT/US2018/046543
§ 371 (c)(1),
(2) Date: Feb. 24, 2020

(87) PCT Pub. No.: WO2019/040310
PCT Pub. Date: Feb. 28, 2019

(65) Prior Publication Data
US 2020/0251031 A1    Aug. 6, 2020

Related U.S. Application Data

(60) Provisional application No. 62/549,862, filed on Aug. 24, 2017.

(51) Int. Cl.
G09G 3/00 (2006.01)
G09G 3/20 (2006.01)
G06T 7/00 (2017.01)

(52) U.S. Cl.
CPC .......... *G09G 3/006* (2013.01); *G06T 7/0004* (2013.01); *G09G 3/2003* (2013.01); *G09G 2320/0693* (2013.01)

(58) Field of Classification Search
None
See application file for complete search history.

(56) References Cited

U.S. PATENT DOCUMENTS 4,754,329 A    6/1988 Lindsay et al.
7,907,154 B2    3/2011 Rykowski et al.
(Continued)

OTHER PUBLICATIONS

International Search Report and Written Opinion dated Oct. 29, 2018 in International Patent Application No. PCT/US2018/046543, 8 pages.

*Primary Examiner* — Aneeta Yodichkas
(74) *Attorney, Agent, or Firm* — Perkins Coie LLP

(57) ABSTRACT

Systems and methods for measuring characteristics of an electronic visual display are disclosed herein. A method configured in accordance with embodiments of the present technology for measuring an electronic visual display can include, for example, analyzing a region of interest ("ROI") in an image taken of at least a portion of the electronic visual display. The method determines a center and bounds of the ROI that are, in general, floating point values rather than whole pixel locations. The method then samples whole imaging device pixels and/or fractional imaging device pixels within the bounds of the ROI and determines whether the pixels and/or fractional pixels fall within, outside, or partially within the ROI. Depending on the position of the pixels and/or fractional pixels relative to the ROI, the pixels and/or fractional pixels can be weighted and/or summed to determine an overall image characteristic for the ROI.

20 Claims, 6 Drawing Sheets

(56) References Cited

U.S. PATENT DOCUMENTS

| | | |
|---|---|---|
| 7,911,485 B2 | 3/2011 | Rykowski et al. |
| 2003/0215129 A1 | 11/2003 | Yang et al. |
| 2010/0135563 A1 | 6/2010 | Kelly et al. |
| 2014/0043350 A1* | 2/2014 | Ikeda ................ G01J 1/02 345/589 |
| 2014/0267784 A1* | 9/2014 | Rykowski .......... H04N 17/04 348/189 |
| 2016/0203584 A1* | 7/2016 | Wu .................... G06T 7/11 382/195 |
| 2016/0358582 A1* | 12/2016 | Lee .................... G06F 3/1446 |
| 2017/0323475 A1* | 11/2017 | Moreton ............. G06T 15/80 |

* cited by examiner

METHODS AND SYSTEMS FOR MEASURING ELECTRONIC VISUAL DISPLAYS USING FRACTIONAL PIXELS

RELATED APPLICATIONS

This application claims the benefit of U.S. Provisional Patent Application No. 62/549,862, filed on Aug. 24, 2017, the entire contents of which are incorporated herein by reference.

TECHNICAL FIELD

The present disclosure relates generally to electronic visual displays, and more particularly, to methods and systems for measuring the output from such displays.

BACKGROUND

Electronic visual displays ("displays") have become commonplace. Displays of increasingly high resolution are used in a wide variety of contexts, from personal electronics with screens a few inches or smaller in size to computer screens and televisions several feet across to scoreboards and billboards covering hundreds of square feet. Virtually all displays are made up of arrays of individual light-emitting elements called "pixels." In turn, each pixel can be up of a plurality of light-emitting points (e.g., one red, one green, one blue, and/or one white). The light-emitting points are termed "subpixels."

It is often desirable to measure characteristics of some portion of a display. For example, it is often desirable to measure the color and brightness of each pixel or subpixel in order to analyze and/or calibrate the display. In the case of calibration, adjustments can then be determined so the pixels can display particular colors at desired brightness levels. However, measuring such characteristics is made more difficult as the resolution of many displays continues to increase.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

DETAILED DESCRIPTION

A. Overview

Figure 1:
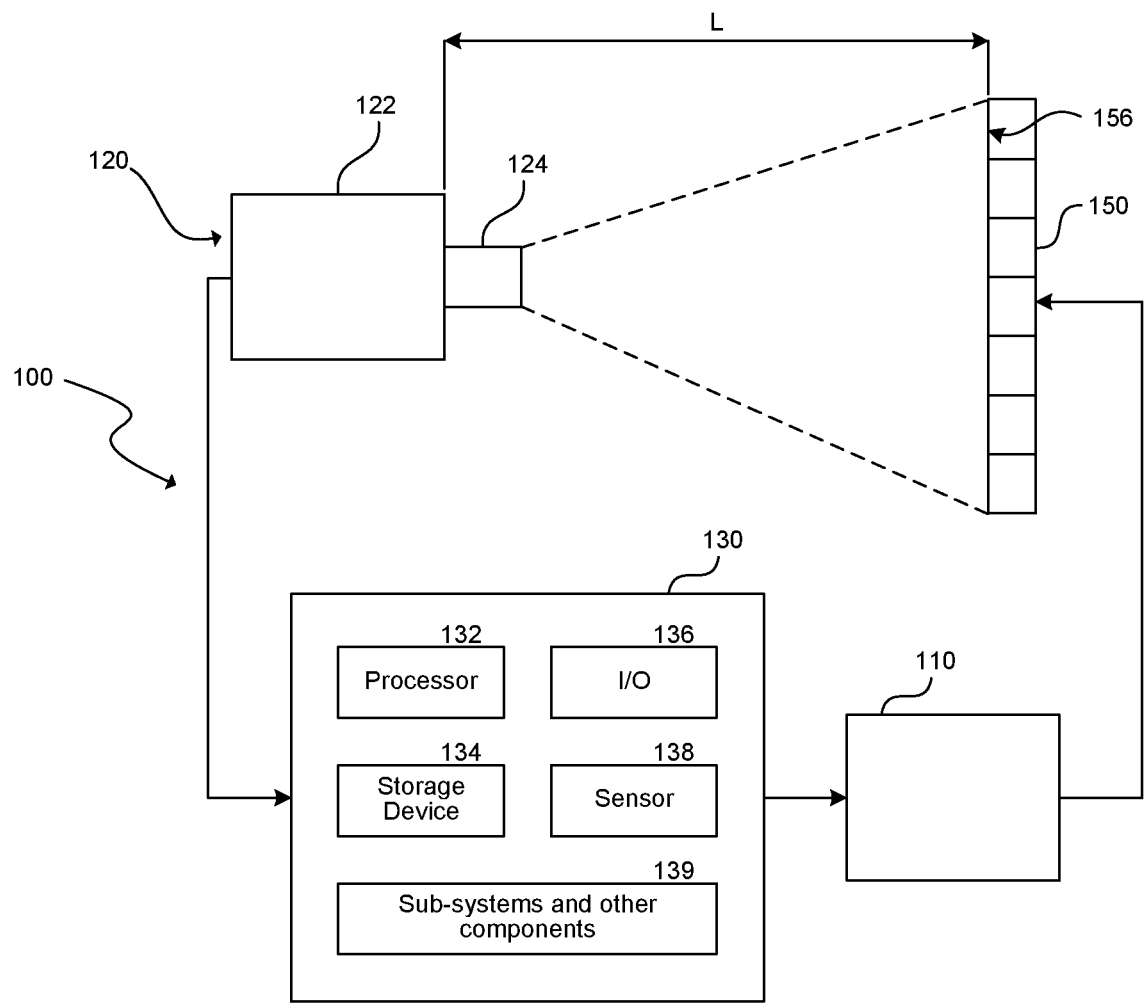
FIG. 1 is a schematic block diagram of an electronic visual display calibration system configured in accordance with an embodiment of the present technology.

The following disclosure describes electronic visual display measurement systems and associated methods for measuring electronic visual displays. As described in greater detail below, a method and/or system configured in accordance with an embodiment of the present technology is configured to measure image characteristics (e.g., the luminance and/or the color) of individual pixels, subpixels, or other features of an electronic visual display, such as and organic light-emitting diode ("OLED") display or a high-resolution liquid crystal display ("LCD").

Some embodiments of the present technology use an imaging device to measure all or a portion of the pixels and/or subpixels of a display ("display pixels"). In particular, the imaging device can capture one or more images of the display in different states of illumination (e.g., all display pixels illuminated, a fractional pattern of the display pixels illuminated, only certain subpixels illuminated, etc.). The display pixels are therefore represented in the images captured by the imaging device. More specifically, the display pixels are represented in an array of pixels ("imaging device pixels") forming each captured image. Typically, the imaging device has a considerably higher resolution than the display itself such that a single display pixel is captured in multiple imaging device pixels.

The inventors have recognized that when display pixels are very closely spaced, such as is typical in many OLED displays, LCDs, and high resolution light-emitting diode ("LED") displays, measuring characteristics of individual display pixels becomes more difficult. For example, some imaging device pixels in an image captured by an imaging device can include data from more than one display pixel (i.e., adjacent display pixels can overlap in one or more imaging device pixels), and/or the center of a display pixel may not align with any portion of the imaging device pixel array. Similarly, for high resolution displays, a region of interest ("ROI") in the image may contain only a small number of imaging device pixels (e.g., less than 100), which increases the likelihood of measurement error, due to adjacent display pixels that overlap in one or more imaging device pixels.

Accordingly, embodiments of the present technology determine a ROI in an image taken by an imaging device that includes only a portion of the imaging device pixels on the edge of the ROI (i.e., fractional imaging device pixels), so as to better approximate the extent of a display pixel (or other feature) of the display to be measured. In some embodiments, for example, a weighted average of imaging device pixel values can be used to determine a center for the ROI that is not necessarily aligned with any single imaging device pixel. Imaging device pixels are then sampled in a bounded area around the center to determine whether they fall within, partially within, or outside the ROI. In some embodiments, a value of an image characteristic for each sampled pixel can be determined by scaling a value of the whole pixel by the fractional portion of the pixel that falls within the ROI. The individual image characteristics for each sampled pixel can then be summed to determine an overall image characteristic of the ROI (e.g., the luminance of a particular display pixel).

In contrast with the present technology, conventional techniques for assessing image characteristics of the display pixels include measuring a display or a portion of a display to begin the process. Such techniques then include centering a ROI to be measured on the imaging device pixel array, which may not correspond to centering the ROI on the display pixel array, and then summing a measurement value of one or more surrounding, whole imaging device pixels that approximate the extent of the display pixel. As a result, any "overlap" in the imaging device pixels is not discounted and the measurement can include significant error. Of course, increasing the resolution of the imaging device can reduce this source of error, but such a camera—with resolution high enough for the display to be measured accurately using conventional approaches—is expected to be prohibitively expensive and/or unavailable. Measuring and calibrating such displays using conventional techniques is therefore often impractical and/or too expensive.

In contrast with conventional techniques, embodiments of the present technology are expected to enable precise measurement of individual pixel or subpixel output for any display (e.g., an OLED display) without requiring expensive, high resolution imaging devices.

Certain details are set forth in the following description and in FIGS. 1-6 to provide a thorough understanding of various embodiments of the disclosure. However, other details describing well-known structures and systems often associated with visual displays and related optical equipment and/or other aspects of visual display calibration systems are not set forth below to avoid unnecessarily obscuring the description of various embodiments of the disclosure.

Many of the details, dimensions, angles, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

B. Embodiments of Electronic Visual Display Measurement Systems and Associated Methods for Measuring Electronic Visual Displays FIG. 1 and the following discussion provide a brief, general description of a suitable environment in which a system for measuring characteristics of electronic visual displays may be implemented. Although not required, aspects of the invention are described in the general context of computer-executable instructions, such as routines executed by a general-purpose computer, a personal computer, a server, or other computing system. The invention can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

FIG. 1 is a schematic block diagram of an electronic visual display measurement and calibration system 100 ("system 100"). The system 100 includes at least a computing device 130 operably coupled to an imaging device 120 (e.g., an imaging colorimeter or other photometer), and is configured to collect, manage, and/or analyze display data for the purpose of processing images that are shown on an electronic visual display 150. In some embodiments, the imaging device 120 can be spaced apart from the display 150 (e.g., so that the entire display 150 is within the field of view of the imaging device 120) and can be configured to sense or capture display information (e.g., color data, luminance data, etc.) from illuminated pixels or subpixels of the display 150. The captured display information is transferred from the imaging device 120 to the computing device 130. The computing device 130 is configured to store, manage, and/or analyze the display information from the display 150.

In some embodiments, the system 100 further includes a pattern generator 110 for generating patterns 156 (e.g., static image patterns, video streams comprised of a series of image patterns, etc.) on the display 150. For example, the pattern generator 110 can illuminate every next nth pixel of the display 150. This process can be repeated (e.g., n times) until the computing device 130 obtains display information for all the pixels or subpixels of the entire display 150. The computing device 130 is configured to cause the pattern generator 110 to send images 156 (e.g., pixel or subpixel patterns) to the display 150. In various embodiments, the pattern generator 110 is standalone hardware test equipment, a logic analyzer add-on module, a computer peripheral operably coupled to the computing device 130, or computer-executable instructions stored in the computing device 130 or in a controller connected to the display 150. In other embodiments, the pattern generator 110 operates independently of the computing device 130. In alternative embodiments, the patterns 156 are provided to the display 150 via standard video signal input, e.g., using a DVI, HDMI, or SDI input to the display.

The imaging device 120 can include a camera 122, such as a digital camera suitable for high-resolution imaging. For example, the camera 122 can include optics (e.g., a lens 124) capable of measuring subpixels of the display 150. If the displayed pattern 156 does not illuminate adjacent subpixels or pixels, imaging resolution requirements for the camera 122 may be less stringent, allowing the use of a less expensive imaging device 120. In some embodiments, the camera 122 can be a CCD camera. Suitable CCD digital color cameras include ProMetric® imaging colorimeters and photometers, which are commercially available from the assignee of the present disclosure, Radiant Vision Systems, LLC, of Redmond, Wash. In other embodiments, the camera 122 can be a complementary metal oxide semiconductor ("CMOS") camera, or another type of suitable camera for imaging with sufficient resolution at a certain distance from the display. Suitable imaging devices 122 and lenses 124 are disclosed in U.S. Pat. Nos. 7,907,154 and 7,911,485, both of which are incorporated herein by reference in their entireties.

In operation, the imaging device 120 can be positioned a distance L from the display 150 that is suitable for viewing and/or capturing display information from the display 150. In some embodiments, for example, the imaging device 120 can be positioned at a distance L that is generally similar to a typical viewing distance of the display 150. In other embodiments, however, the distance L can be less than a typical viewing distance and direction, and the imaging system 120 can be configured to account for any viewing distance and/or direction differences. In some embodiments, the imaging device 120 has a wide field of view and the distance L can be less than the width of the display 150 (e.g., approximately one meter for a typical HDTV display). In other embodiments, the imaging device 120 has a long-focus lens 124 (e.g., a telephoto lens) and the distance L can be significantly greater than the width of the display 150 (e.g., between approximately 100 and 300 meters for an outdoor billboard or video screen). In yet other embodiments, the distance L can have other values.

The computing device 130 is configured to receive, manage, store, and/or process the display data collected by the imaging device 120 (e.g., for the purpose of determining one or more characteristics of the display 150 and/or adjusting the appearance of images that will be displayed on the display 150). In some embodiments, the computing device 130 is further configured to determine one or more correction factors for the display 150 or for its pixels or subpixels. The correction factors for the display 150 can be applied to the computing components controlling the display 150 to calibrate the display 150. In some embodiments, display data associated with the display 150, including correction factors and related data, can be processed by a computer that is separate from the imaging device 120. A typical display 150, such as a quad extended graphics array ("QXGA")-resolution (2048×1536) visual display for example, can have over nine million subpixels that provide display data for the computing device 130 to manage and process. In some embodiments, the pattern generator 110 may illuminate only a fraction of those subpixels at any one time, but by sending a series of patterns 156 to the display 150, information about all the subpixels will be delivered to the computing device 130. As such, the computing device 130 includes the necessary hardware and corresponding computer-executable instructions for managing and processing the display data.

More specifically, the computing device 130 configured in accordance with an embodiment of the present technology can include a processor 132, a storage device 134, input/output devices 136, one or more sensors 138 in addition to sensors of the imaging device 120, and/or any other suitable subsystems and/or components 139 (displays, speakers, communication modules, etc.). The storage device 134 can include a set of circuits or a network of storage components configured to retain information and provide access to the retained information. For example, the storage device 134 can include volatile or non-volatile memory. As a more specific example, the storage device 134 can include random access memory (RAM), magnetic disks or tapes, Flash memory. In some embodiments, the storage device 134 is configured to store the display data from the patterns 156 shown on the display 150.

The computing device 130 includes computer readable media (e.g., storage device 134, disk drives, or other storage media, excluding only a transitory, propagating signal per se) including computer-executable instructions stored thereon that, when executed by the processor 132 or computing device 130, cause the processor 132 or computing device 130 to process an image as described in detail below with reference to FIGS. 3A-6. Moreover, the processor 132 can be configured for performing or otherwise controlling calculations, analysis, and any other functions associated with the methods described herein.

In some embodiments, the storage device 134 includes computer-executable instructions to control the imaging device 120, to identify portions of the display 150 (e.g., subpixels of the display 150), and to image or otherwise extract the display data (e.g., subpixel brightness data, pixel color data, etc.). Moreover, the storage device 134 can also store one or more databases used to store the display data shown on display 150, as well as calculated correction factors for the display data. In one embodiment, for example, the database is an HTML file designed by the assignee of the present disclosure. In other embodiments, however, the display data is stored in other types of databases or data files.

One of ordinary skill in the art will understand that although the system 100 illustrated in FIG. 1 includes separate components (e.g., the pattern generator 110, the imaging device 120, and the computing device 130), in other embodiments the system 100 can incorporate more or less than three components. Moreover, the various components can be further divided into subcomponents, or the various components and functions may be combined and integrated. In addition, these components can communicate via wired or wireless communication, as well as by information contained in storage media.

Figure 2:
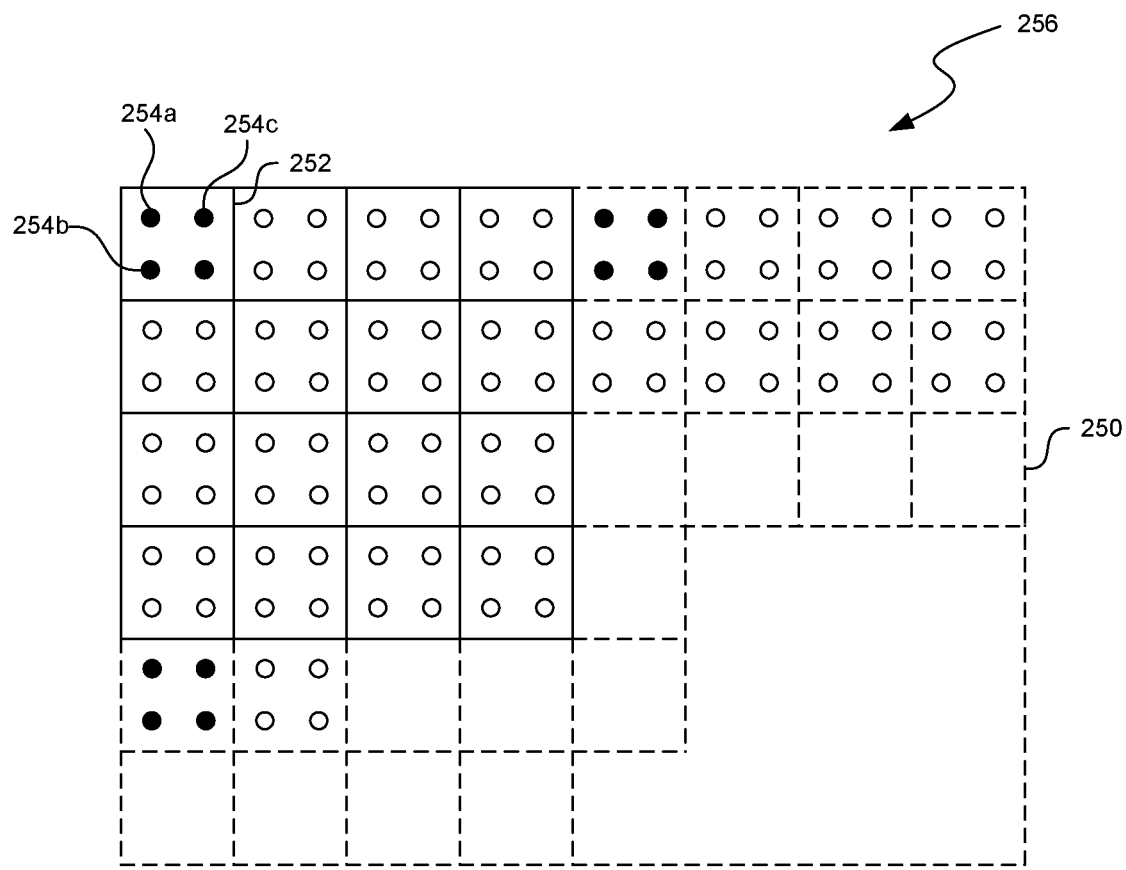
FIG. 2 is an enlarged partial front view of a portion of an electronic visual display, i.e., a partial view of pixels and subpixels, configured to be used with embodiments of the present technology.

FIG. 2 is an enlarged partial front view of a portion of an electronic visual display 250 ("display 250") configured to be used with embodiments of the present technology. The display 250 is made up of a large number (e.g., millions) of individual light sources or light-emitting elements or pixels 252. Each display pixel 252 comprises multiple light-emitting points or subpixels 254 (identified as first, second, and third subpixels 254a-254c, respectively). In certain embodiments, the display subpixels 254 are OLEDs or LEDs. For example, the display subpixels 254a-254c can correspond to red, green, and blue LEDs, respectively. In other embodiments, each display pixel 252 can include more or less than three display subpixels 254, and the display subpixels 254 can be laid out in any geometric arrangement.

In addition to the color level of each subpixel 254, the luminance level of each display subpixel 254 can vary. Accordingly, the additive primary colors represented by, for example, a red subpixel, a green subpixel, and a blue subpixel can be selectively combined to produce the colors within the color gamut defined by a color gamut triangle. For example, when only "pure" red is displayed, the green and blue subpixels may be turned on only slightly to achieve a specific chromaticity for the red color. In addition, each pixel may have a variable brightness level. For example, each display pixel 252 or display subpixel 254 can have input levels ranging from 0 to 255, where, for example, 255 is full brightness, 128 is one half brightness, 64 is one quarter brightness, 32 is one eighth brightness, etc. The present technology can be used to measure one or more of the foregoing characteristics of an individual pixel, subpixel, group of subpixels, and/or group of pixels. Data from such measurements can be used in calibration to achieve the same chromaticity for a particular color at various input brightness levels, or, for example, to improve the uniformity of color and luminance response curves for each pixel or subpixel.

In some embodiments, the display 250 can display a pattern 256 of illuminated display pixels 252. For example, as shown in FIG. 2, every fourth display pixel 252 vertically and every fourth display pixel 252 horizontally can be illuminated while the pixels between are switched off. Thus, for the illustrated pattern 256, only one of every sixteen display pixels 252 is illuminated, and the spaces between illuminated pixels are four times larger in each direction than there would be if every display pixel 230 were illuminated.

Figure 3A:
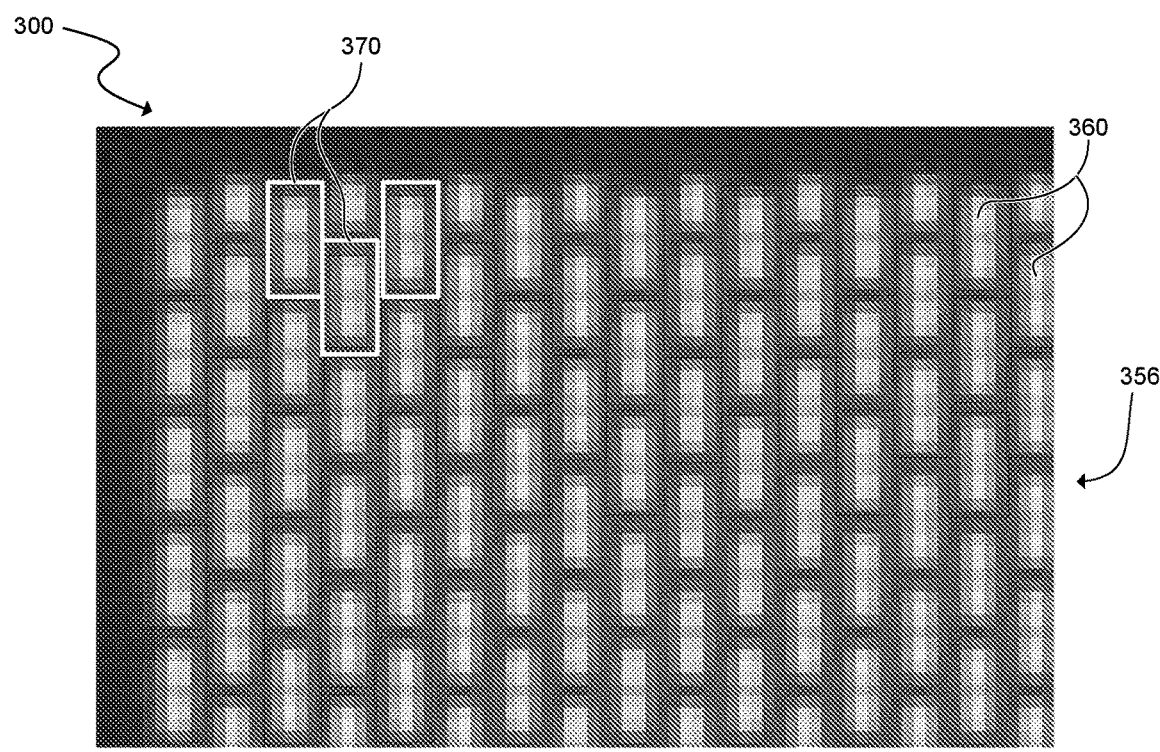
FIG. 3A is an enlarged partial view of an image taken of an electronic visual display, i.e., a partial view of pixels and subpixels, in accordance with an embodiment of the present technology.

FIG. 3A illustrates a portion of an image 300 of an electronic visual display to be measured (e.g., the display 250), captured by an imaging device (e.g., the imaging device 120 of the system 100). The image 300 comprises a pixel array having a plurality of pixels 360 including information about characteristics of the display being measured (e.g., color data, luminance data, etc.). The image 300 can further contain a pattern 356 of alternating bright and dark regions that generally corresponds to, for example, the pattern 256 generated on the display 250. As illustrated in FIG. 3A, one or more regions of interest ("ROI") 370 can be defined in the image 300 to, for example, correspond to a particular bright spot (e.g., an illuminated display pixel 252 or display subpixel 254 of the display 250) to be measured. Depending on the pitch of the display 250 (i.e., the distance between display pixels 252 or display subpixels 254) and the resolution of the imaging device that produces the image 300, the ROI 370 may contain only a few pixels 360 (e.g., less than 100, less than 50, etc.) and/or only a few subpixels.

Figure 3B:
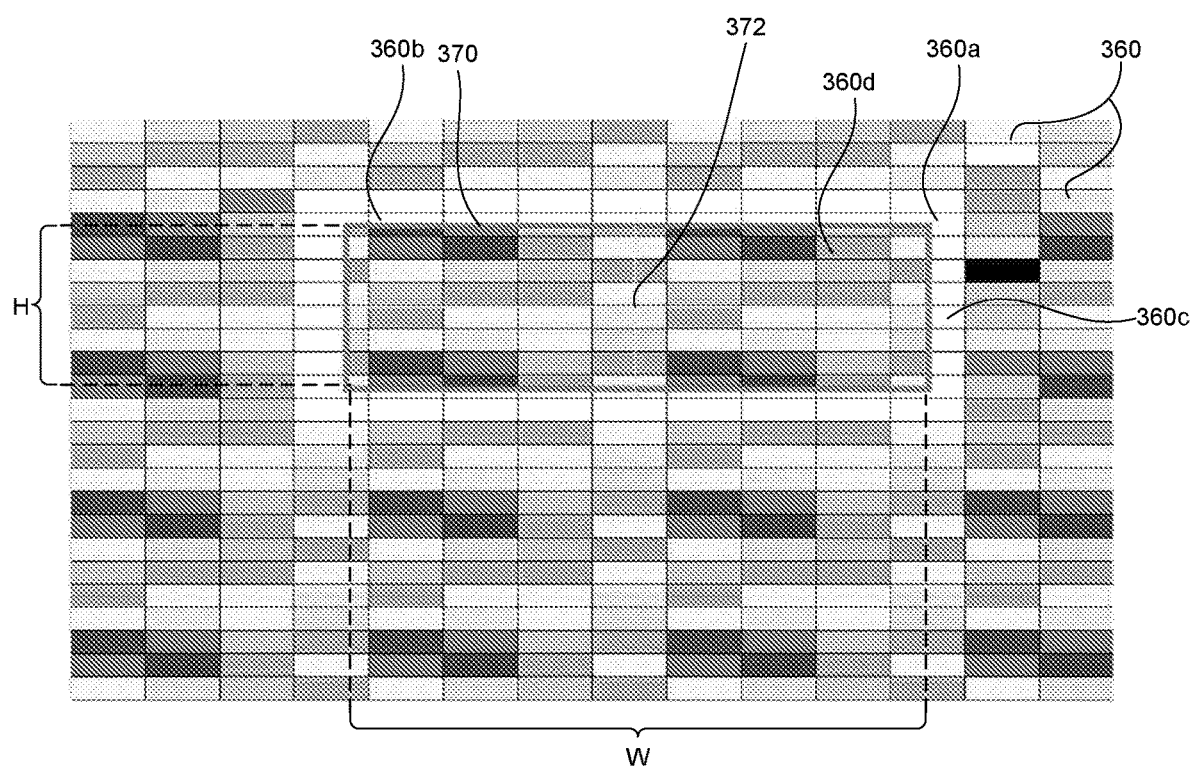
FIG. 3B is an enlarged schematic view of a portion of the image shown in FIG. 3B.

FIG. 3B is a schematic illustration of a portion of the image 300 showing the display pixels 360 and a single ROI 370 whose center is not necessarily centered on an imaging device pixel configured in accordance with the present technology. As shown, the ROI 370 is a rectangle having a center 372, a vertical height H, and a horizontal width W. As described in further detail below with reference to FIG. 4, some of pixels 360 can be wholly contained within the ROI 370, while some of the pixels 360 can be partially within and partially outside of the ROI 370 in either or both of the vertical and horizontal dimensions. For example, an individual pixel 360a can be partially within and partially outside the ROI 370 in both the vertical and horizontal dimensions (i.e., a corner of the ROI falls within the pixel 360a). Similarly, an individual pixel 360b can be only partially within the ROI 370 in the vertical dimension, an individual pixel 360c can be only partially within the ROI 370 in the horizontal dimension, and an individual pixel 360d can be wholly within the ROI 370.

Figure 4:
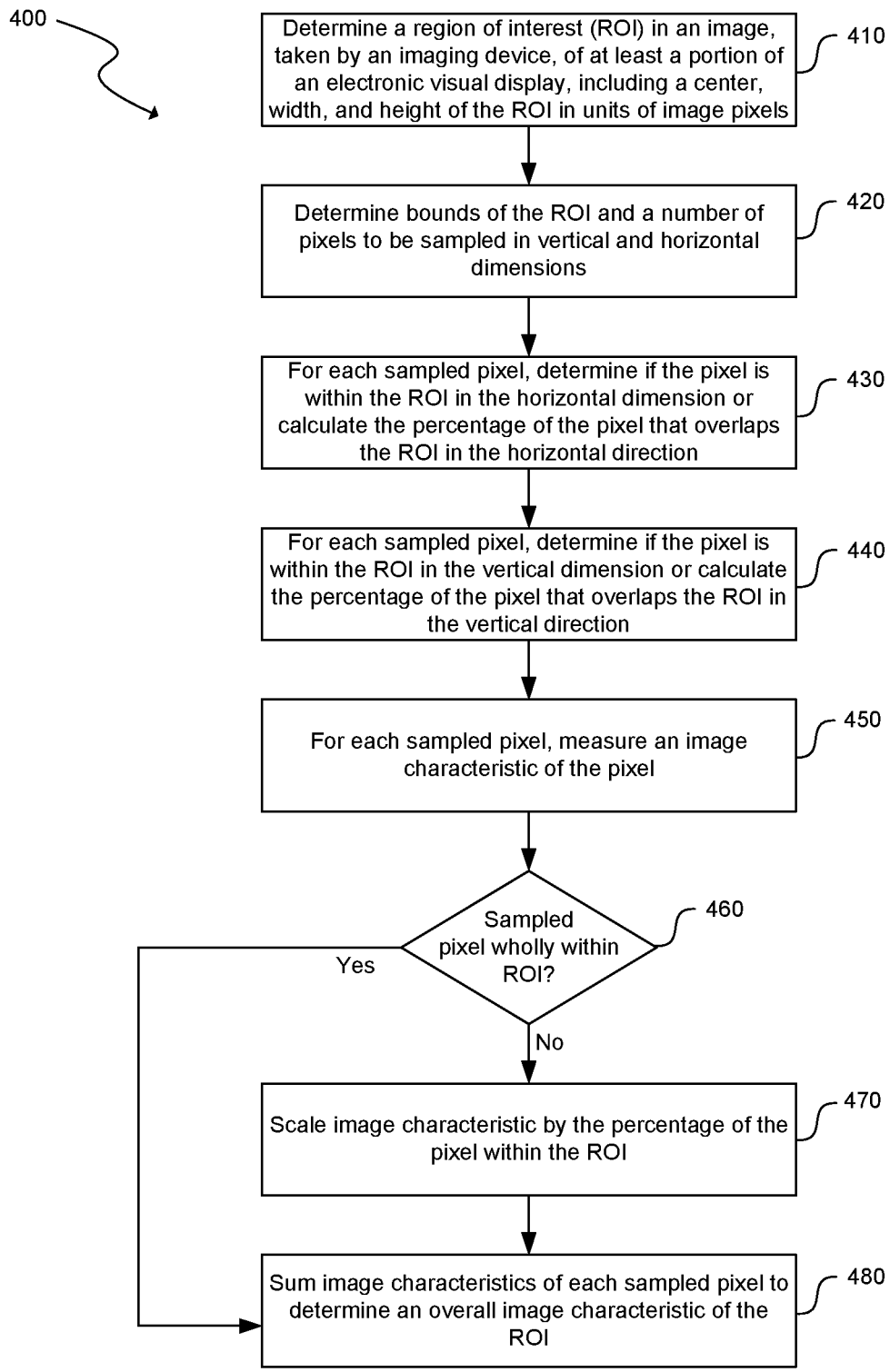
FIG. 4 is a flow diagram of a method or process in accordance with an embodiment of the present technology.

FIG. 4 is a flow diagram of a method or process 400 configured in accordance with the present technology for measuring an image characteristic (e.g., color, luminance, etc.) of a rectangular ROI containing fractional pixels and that is not necessarily centered on any particular pixel. For example, as referenced herein, the method 400 can be used to measure one or more image characteristics of the ROI 370 of the image 300 illustrated in FIG. 3B.

At block 410, the method includes determining a ROI in an image (e.g., the image 300), taken by an imaging device (e.g., the imaging device 120), of at least a portion of an electronic visual display (e.g., the electronic visual display 150 or 250). Determining the ROI includes determining a center, a horizontal width, and a vertical height of the ROI measured in units of image pixels (i.e., pixels of the image taken by the imaging device). More specifically, each of the center location, width, and height can be determined as a floating point representation (i.e., fraction) of a number of pixels (e.g., 4.5 pixels). The location of the center of the ROI can be determined using any suitable means applicable to the particular ROI to be measured. In some embodiments, the center of the ROI may be found as the centroid (based on, e.g., a luminance value) of some group of pixels, resulting in an (x,y) pixel location which is not centered on an exact pixel, but rather located between pixels. For example, as shown in FIG. 3B, the center 372 of the ROI 370 is not located on an exact pixel 360 but rather between such pixels. In certain embodiments, other means of weighting a group of pixels can be used to determine the center location of the ROI. In other embodiments, user input can specify the center location. In certain embodiments, an initial center location of the ROI is determined (e.g., by user input), and subsequently refined by another means for determining a center location (e.g., by determining the centroid of a group of pixels and/or fractional pixels). By using a center location that is not necessarily centered on any particular pixel, the ROI can better approximate the center of a feature of the electronic visual display being measured (e.g., a pixel or subpixel of the electronic display). Accordingly, the method 400 can provide for better resolution of even closely spaced electronic display features.

In some embodiments, for example, the present technology receives the pixel width and pixel height from user input or from a configuration file. The pixel height and pixel width of the ROI need not be an exact number of pixels, and may instead be a fractional number of pixels. In some embodiments, the technology determines a fixed pixel width and/or pixel height of the ROI based on the characteristics of the display to be measured and the measuring equipment. Such characteristics may include, for example, the size of the display, the type of display (e.g., OLED), the pixel resolution of the display, the pixel density or dot pitch (i.e., distance between pixels) of the display, the distance from the display to the imaging device, the optical resolving power or angular resolution of the imaging device, and the pixel resolution of the imaging device. For example, in some embodiments, the dot pitch of the display to be measured can range from about 50 μm-300 μm. A corresponding pixel width and/or pixel height of the ROI could be set, for example, such that the ROI has an area that approximately corresponds to one dot on the electronic visual display. As illustrated in FIG. 3B, the ROI could have a pixel height and pixel width of approximately 6.5×7.5.

At block 420, the process includes determining the bounds (e.g., a perimeter) of the ROI and the number of pixels to sample in the vertical and horizontal dimensions. In particular, a pixel location for the bounds of the ROI is determined based on the previously determined center, width, and height of the ROI. Then, based on the bounds of the ROI, the technology determines a number of pixels to be sampled in the vertical and horizontal dimensions such that each pixel that is at least partially within the ROI (i.e., each pixel within the bounds or intersecting the bounds of the ROI) is sampled. For example, as shown in FIG. 3B, at least four pixels can be sampled in the vertical dimension both above and below the center 372 (i.e., eight total pixels) to fully sample over the ROI in the vertical dimension. Likewise, at least five pixels can be sampled in the horizontal dimension both to the left and the right of the center 372 (i.e., ten total pixels) to fully sample over the ROI in the horizontal dimension.

At block 430, for each sampled pixel, the technology determines if the pixel is within the ROI in the horizontal dimension or calculates the percentage it overlaps the ROI in the horizontal dimension. In some embodiments, the present technology first determines, for a given sampled pixel, its horizontal distance from the center of the ROI. Then, whether the pixel is within the bounds of the ROI is determined based on the horizontal distance of the pixel from the center, the width of pixels, and the known bounds of the ROI. For example, as shown in FIG. 3B, the technology can determine that the pixel 360d is wholly within the ROI 370 in the horizontal dimension based on, for example, the known bounds of the ROI 370 and the horizontal distance of the pixel 360d from the center 372. Likewise, the technology can similarly determine that pixels 360a and 360c fall only partially within the ROI 370 (i.e., overlap the bounds of the ROI 370), and can proceed to determine a percentage of each of the pixels 360a and 360c that fall within the ROI 370 in the horizontal dimension (e.g., 5%, 7%, 40%, 60%, etc.).

At block 440, for each sampled pixel, the technology determines if the pixel is within the ROI in the vertical dimension or calculates the percentage it overlaps the ROI in the vertical dimension. In some embodiments, the technology first determines, for a given sampled pixel, its vertical distance from the center of the ROI. Then, the technology can determine whether the pixel is within the bounds of the ROI based on the vertical distance of the pixel from the center, the pixel height, and the known bounds of the ROI. For example, as shown in FIG. 3B, the technology can determine that the pixel 360d is wholly within the ROI 370 in the vertical dimension based on, for example, the known bounds of the ROI 370 and the vertical distance of the pixel 360d from the center 372. Likewise, the technology can similarly determine that the pixels 360a and 360b fall only partially within the ROI 370, and proceed to determine a percentage of each of the pixels 360a and 360b that is within the ROI 370 in the vertical dimension.

At block 450, the technology measures, for each sampled pixel, an image characteristic of the pixel (e.g., color value, luminance value, etc.). The measured image characteristic of each pixel provides information about the electronic visual display being measured. In some embodiments, for example, the luminance of each sampled pixel is measured, which provides (partial) information about the luminance of a particular feature of the display being measured (e.g., a display subpixel or display pixel). At block 460, the process branches depending on whether a sampled pixel is wholly within the ROI. If the sampled pixel is wholly within the ROI, the measured image characteristic is not scaled. If the sampled pixel is only partially within the ROI, the measured image characteristic is scaled by, for example, the percentage of the pixel that is within the ROI as previously determined. For example, referring again to FIG. 3B, the pixels 360a-360c would be scaled to, for example, reduce the overall magnitude of the measured image characteristics for those pixels. Finally, at block 480, the measured image characteristics of each sampled pixel (scaled to account for pixels being partially within the ROI) are summed to produce an overall image characteristic of the entire ROI. For example, where the measured image characteristic is luminance, the method 400 can determine an overall luminance value for the ROI.

Accordingly, the method 400 assigns a lower weight to fractional pixels included within the ROI. As described above, when the display being measured includes closely spaced pixels and/or subpixels, the fractional pixels at the edge of the ROI often include information about more than one display pixel or subpixel (i.e., they overlap in the image produced by the imaging device). Thus, a measurement using only the measured value of whole pixels (i.e., at the resolution of the image) can lead to significant error. However, the present technology advantageously reduces the contribution of these pixels to more accurately determine the overall image characteristic (e.g., luminance) of the ROI. In some embodiments, the overall image characteristic of the ROI corresponds to the characteristic of a particular display pixel or display subpixel of the electronic visual display being measured. In other embodiments, the overall image characteristic of the ROI corresponds to a different feature of the display being measured, such as the location of a crack or other irregularity.

In some embodiments, the method 400 includes further operations for determining the overall image characteristic of the ROI. For example, in some embodiments, the overall image characteristic of the ROI is divided by the area of the ROI to produce an averaged, per pixel, image characteristic of the ROI. The technology can determine the area of the ROI by, for example, adding the number of pixels within the ROI or by taking the area as the product of the height and width of the of the ROI.

Figure 5A:
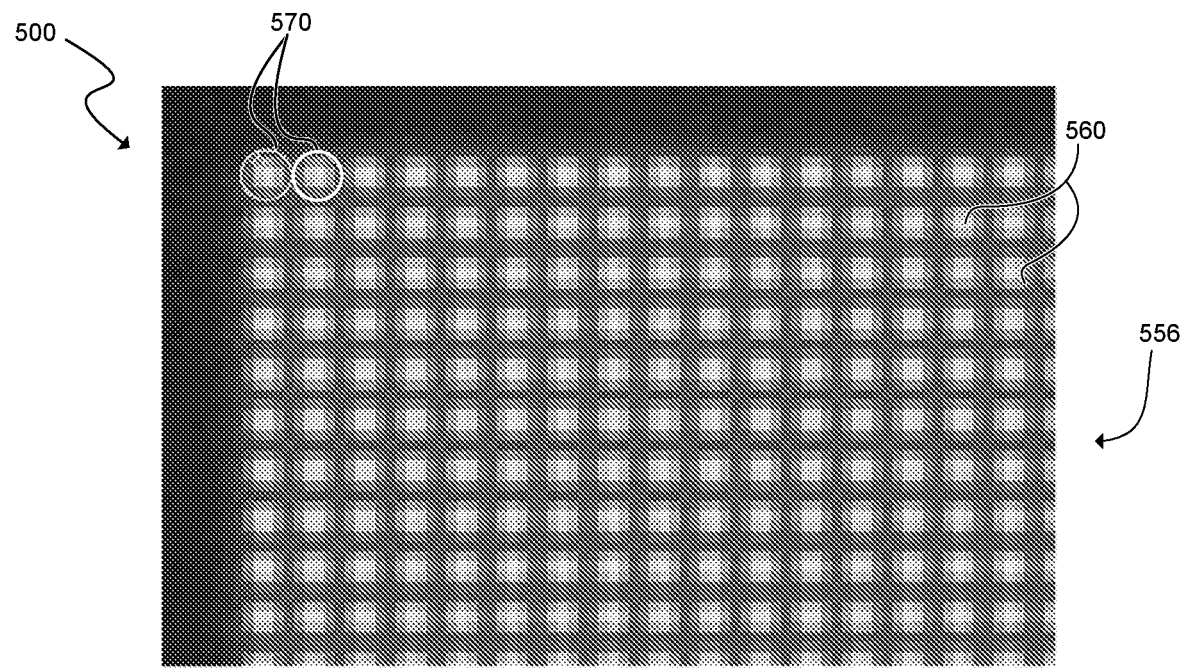
FIG. 5A is an enlarged partial view of an image taken of an electronic visual display, i.e., a partial view of pixels and subpixels, in accordance with an embodiment of the present technology.

FIG. 5A illustrates a portion of an image 500 of an electronic visual display to be measured (e.g., the display 250) as captured by an imaging device (e.g., the imaging device 120 of the system 100). The image 500 can include features generally similar to the image 300 described above with reference to FIG. 3A. For example, the image 500 comprises a pixel array having a plurality of pixels 560 including information about characteristics of the display being measured (e.g., color data, luminance data, etc.). The image 500 can further contain a pattern 556 of alternating bright and dark regions that generally corresponds to, for example, the pattern 256 generated on the display 250.

As illustrated in FIG. 5A, one or more ROI's 570 can be defined in the image 500 to, for example, correspond to a particular bright spot (e.g., an illuminated display pixel 252 or display subpixels 254 of the display 250) to be measured. In general, the shape of the ROI 570 can be selected so as to best align or match with particular features of the pattern 556. For example, as shown in FIG. 5A, the ROI's 570 can have a circular shape—as opposed to the rectangular ROI's 370 illustrated in FIGS. 3A and 3B. The circular ROI's 570 better correspond to bright regions of the pattern 556 than would a rectangular ROI. The differences illustrated in the patterns 356 and 556 of FIGS. 3A and 5A can arise from differences in the display being measured. For example, certain OLED displays can have widely different display patterns (i.e., different layouts of display pixels and display subpixels), meaning that the most suitable shape for a ROI can vary depending on the display being measured. Accordingly, the ROI 570 can have any suitable shape (e.g., square, polygonal, oval, oblong, etc.).

Figure 5B:
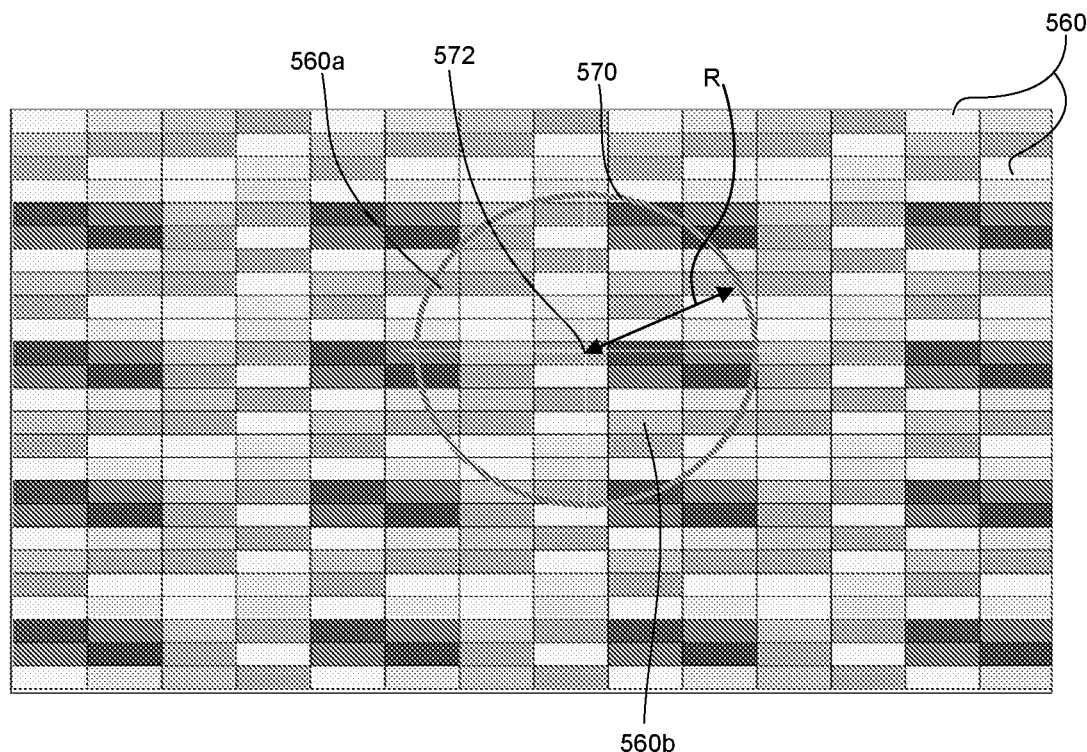
FIG. 5B is an enlarged schematic view of a portion of the image shown in FIG. 4B.

FIG. 5B is a schematic illustration of a portion of the image 500 showing the pixels 560 and a single circular ROI 570 having a center 572 and a radius R. Some of the pixels 560 are wholly contained within the ROI 570, while other pixels 560 are partially within and partially outside the ROI 570. For example, an individual pixel 560a is partially within and partially outside the ROI 570, while an individual pixel 560b is wholly within the ROI 570.

Figure 6:
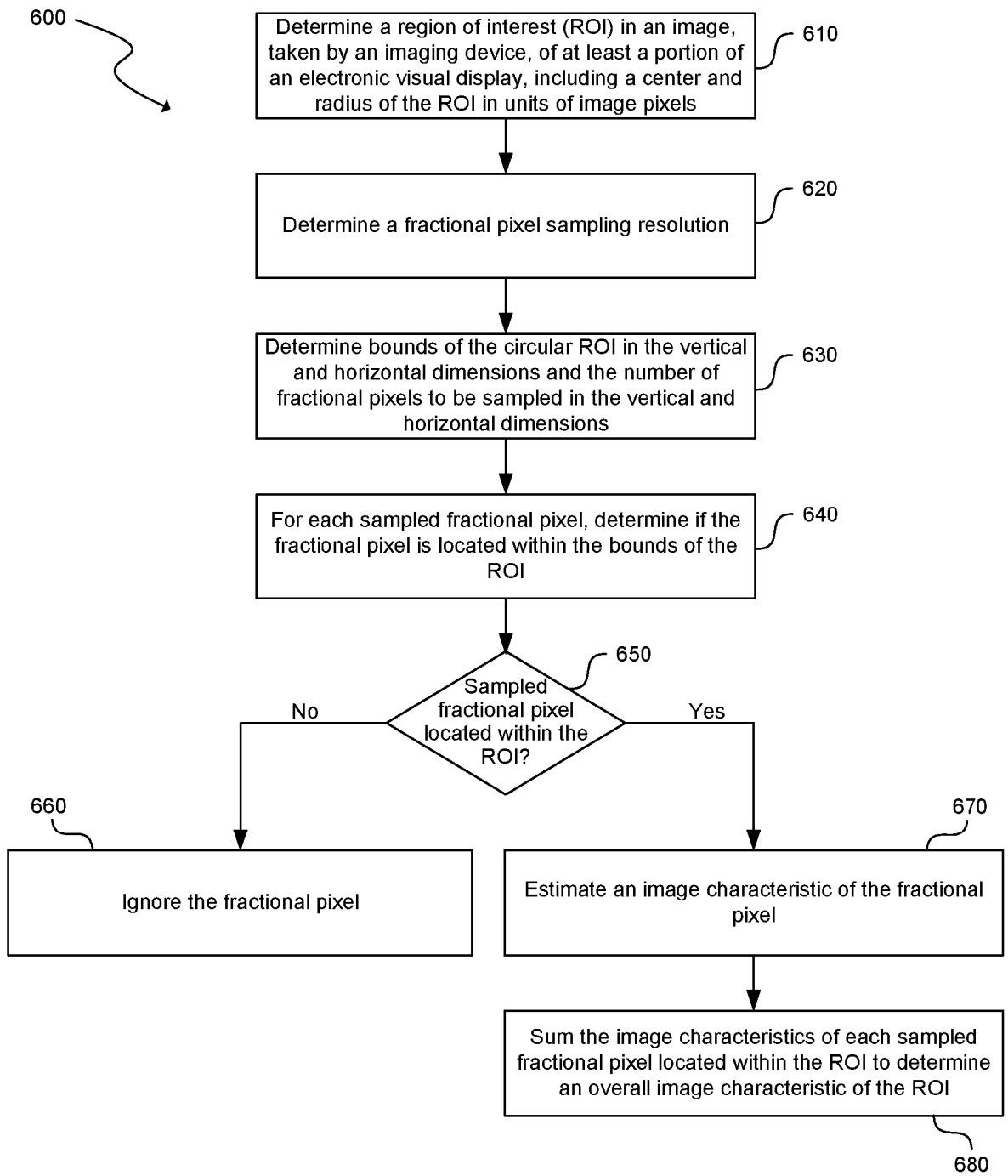
FIG. 6 is a flow diagram of a method or process in accordance with an embodiment of the present technology.

FIG. 6 is a flow diagram of a method or process 600 configured in accordance with the present technology for measuring display information (e.g., color, luminance, etc.) contained within a circular ROI that contains fractional pixels and that is not necessarily centered on any given pixel. For example, as referenced herein, the method 400 can be used to measure one or more image characteristics of the ROI 570 of the image 500 illustrated in FIG. 5B.

At block 610, the method includes determining a circular ROI in an image (e.g., the image 500), taken by an imaging device (e.g., the imaging device 120), of at least a portion of an electronic visual display (e.g., the electronic visual display 150 or 250). Determining the ROI includes determining a center and a radius of the ROI measured in units of image pixels (i.e., pixels of the image taken by the imaging device). The radius of the ROI need not be an exact number of pixels, and may instead be a fractional (i.e., floating point value) number of pixels (e.g., 4.5 pixels). More specifically, the location of the center and the radius can be determined as a floating point representation of a number of pixels in the image taken by the imaging device. The location of the center of the ROI can be determined using any suitable means applicable to the particular ROI to be measured. In some embodiments, the center of the ROI may be found as the centroid of some group of pixels or fractional pixels, resulting in an (x,y) pixel location which is not centered on an exact pixel, but rather located between pixels. For example, as shown in FIG. 5, the center 572 of the ROI 570 is not centered on or otherwise aligned with a particular one of the pixels 560. Moreover, in certain embodiments, other means of weighting a group of pixels can be used to determine the center location of the ROI. In other embodiments, user input can be used to determine the center location of the ROI. In certain embodiments, an initial center location of the ROI is determined (e.g., by user input), and subsequently refined by another means of center location (e.g., by determining the centroid of a group of pixels or subpixels). By using a center location that is not necessarily centered on any particular pixel, the ROI can better approximate the center of a feature of the electronic visual display being measured (e.g., a pixel or subpixel of the electronic display). Accordingly, the method 500 can provide for better resolution of even closely spaced electronic display features.

At block 620, the process determines a fractional pixel sampling resolution ("sampling resolution"). The sampling resolution is greater than 0 pixel and less than 1.0 pixel (e.g., 0.1 pixel, 0.2 pixel, 0.5 pixel, etc.) and sets the increment size over which the ROI is to be sampled. For example, a sampling resolution of 0.1 can correspond to 10 steps across a given pixel. In some embodiments, the present technology receives the radius and/or sampling resolution from user input or from a configuration file. In certain embodiments, the technology determines a fixed radius of the ROI and/or the sampling resolution based on the characteristics of the display to be measured and the measuring equipment. Such characteristics may include, for example, the size of the display, the type of display (e.g., OLED), the pixel resolution of the display, the pixel density or dot pitch (i.e., distance between pixels) of the display, the distance from the display to the imaging device, the optical resolving power or angular resolution of the imaging device, and the pixel resolution of the imaging device. For example, in some embodiments, the dot pitch of the display to be measured can range from about 50 µm-300 µm. A corresponding radius of the ROI could be set, for example, such that the ROI has an area that approximately corresponds to one dot of the electronic visual display. As illustrated in the embodiment of FIG. 3B, the ROI could have a radius of about 2.5 horizontal pixels and 6.5 vertical pixels. In other embodiments, however, the ROI may have a different arrangement.

At block 630, the process includes determining the bounds of the ROI in the horizontal and vertical dimensions and the number of pixels to be sampled in the vertical and horizontal dimensions. For example, the technology can determine the pixel location of a rectangular (e.g., square) bounding box in which the circular ROI is inscribed based on the previously determined center and radius of the ROI. The bounds of the ROI are in general floating point values, not whole pixel locations. Then, based on the bounding box and the sampling resolution, a number of fractional pixels to be sampled in the vertical and horizontal dimensions is determined. For example, if the sampling resolution is 0.1 pixel and the radius of the circular ROI is 4.5 pixels, a square bounding box in which the ROI is inscribed will have a height and width of 9 pixels by 9 pixels. Thus, for example, 90 fractional pixels can be sampled in both the vertical and horizontal dimensions. However, if a dimension of the bounding box is not an integer multiple of the sampling resolution (e.g., 9.05 pixels at a 0.1 sampling resolution), the technology can rescale the sampling resolution so that the bounding box will contain an integer number of fractional pixels at the new sampling resolution (e.g., reset the sampling resolution to 0.099450549 so that the sampling comprises the integer number of 91 fractional pixels). In this manner, the technology determines a discrete (integer) number of steps over which to perform the sampling.

At block 640, for each fractional pixel to be sampled, the technology determines if the fractional pixel is located within the ROI. In some embodiments, the technology determines, for a given sampled fractional pixel, its horizontal and vertical distance from the center of the ROI. Then, the technology determines whether the fractional pixel is located completely within the bounds (e.g., a perimeter) of the ROI based on the known center and radius of the ROI, the distance of the fractional pixel from the center, and the pixel pitch.

At block 650, the process branches depending on whether a sampled fractional pixel is located within the ROI. If the sampled fractional pixel is located outside the ROI, or only partially within the ROI, the process proceeds to block 660 and ignores any image characteristics of the sampled fractional pixel outside or partially within the ROI. If the sampled fractional pixel is located within the ROI, the process proceeds to block 670. At block 670, the method includes estimating an image characteristic (e.g., color value, luminance value, etc.) of each sampled fractional pixel located within the ROI. The particular image characteristic of each fractional pixel cannot be directly measured because such image characteristics can only be measured for whole pixels. However, a value can be estimated based on the measured image characteristics of one or more nearby pixels. For example, in some embodiments, interpolation of two or more surrounding whole pixels is used to estimate the image characteristic for each sampled fractional pixel that is within the ROI. More particularly, in certain embodiments, bilinear interpolation of four surrounding pixels (e.g., of the one pixel above, one pixel below, one pixel to the left, and one pixel to the right) can be used to determine the estimated image characteristic for the fractional pixel. In other embodiments, the value of the fractional pixel is determined by using the value of the nearest pixel.

At block 680, once the location of each fractional pixel is determined and an image characteristic is estimated for each fractional pixel located within the ROI, the image characteristics of each fractional pixel within the ROI are summed to produce a single image characteristic representative of the entire ROI. Accordingly, the method 600 includes only those fractional pixels falling within the ROI, and as a result, pixels falling only partially within the ROI are weighted less than those that are within the ROI. As described above, when the display being measured includes closely spaced pixels and/or subpixels, the fractional pixels at the edge of the ROI often include information about more than one display pixel or subpixel (i.e., they overlap in the image produced by the imaging device). The process 600 advantageously reduces the contribution of these pixels to more accurately determine an overall image characteristic of the ROI. For example, where the image characteristic is luminance, an overall luminance value for the ROI is determined. In some embodiments, this value can correspond to the luminance of a particular display pixel or display subpixel of the electronic visual display being measured.

In some embodiments, the method 600 includes performing further operations on the overall image characteristic of the ROI. For example, in some embodiments, the overall image characteristic of the ROI is divided by the area of the ROI to produce an averaged, per pixel, image characteristic of the ROI. The technology can determine the area of the ROI by, for example, adding the number of pixels within the ROI or taking the area as fixed based on the known radius.

In certain embodiments, the image characteristics at two or more of the fractional pixel locations may also be used to determine the initial center location (e.g., a centroid location) as described with reference to block 610 above. In such embodiments, the fractional pixel evaluation of the process 600 can be performed twice: first, to find a final center location for the ROI and, second, to determine the overall image characteristic of the ROI at the final center location.

C. Additional Examples

Several aspects of the present technology are set forth in the following examples.

1. A method in a computing system having an image capture device for measuring one or more characteristics of a region of interest (ROI) in an image captured by the image capture device, the image having an array of a number of pixels containing information about an electronic visual display that is separate from the image capture device, the method comprising:
   determining a fractional pixel location of a center of the ROI and at least one dimension of the ROI in pixels;
   determining a pixel location of bounds of the ROI based on the fractional pixel location of the center and the at least one dimension of the ROI;
   measuring, for each pixel located wholly within the bounds, a first image characteristic of the pixel;
   measuring, for each pixel partially within and partially outside the bounds, a second image characteristic of the pixel;
   scaling each second image characteristic; and
   determining an overall image characteristic for the ROI based at least on a summation of the first image characteristics and the scaled second image characteristics.

2. The method of example 1, further comprising:
   determining an area of the ROI based on the at least one dimension of the ROI; and
   dividing the sum of the first image characteristics and the scaled second image characteristics by the area of the ROI to determine the overall image characteristic.

3. The method of example 1 or example 2 wherein scaling each second image characteristic includes scaling each second image characteristic by the percentage of the corresponding pixel that is within the ROI.

4. The method of any one of examples 1-3 wherein the ROI is rectangular, and wherein the at least one dimension comprises a height and a width of the ROI.

5. The method of any one of examples 1-4 wherein measuring, for each pixel located wholly within the bounds, a first image characteristic of the pixel comprises measuring luminance of each pixel located wholly within the bounds.

6. The method of any one of examples 1-4 wherein measuring, for each pixel located wholly within the bounds, a first image characteristic of the pixel comprises measuring a color value of each pixel located wholly within the bounds.

7. The method of any one of examples 1-6 wherein the ROI is circular, and wherein the at least one dimension is a radius.

8. The method of any one of examples 1-6 wherein determining a fractional pixel location of a center of the ROI comprises:
   determining a center, a horizontal width, and a vertical height of the ROI in units of pixels; and
   using the center, horizontal width, and vertical height, determining a centroid of selected pixels within the ROI.

9. The method of any one of examples 1-6 wherein determining a fractional pixel location of a center of the ROI comprises receiving user input specifying the center of the ROI.

10. The method of any one of examples 1-9 wherein the electronic visual display comprises an organic light-emitting diode (OLED) display.

11. The method of any one of examples 1-10, further comprising calibrating the electronic visual display based, at least in part, on the determined overall image characteristic for the ROI.

12. A method in a computing system in communication with an image capture device for measuring one or more characteristics of a circular region of interest (ROI) in an image captured by the image capture device, the image having an array of a number of pixels containing information about an electronic visual display that is separate from the image capture device, the method comprising:
   determining a fractional pixel location of a center of the ROI and the radius of the ROI in pixels;
   determining a number of fractional pixels to be sampled and the bounds of the ROI based on the radius and the fractional pixel location of the center of the ROI;
   determining, for each sampled fractional pixel, whether the fractional pixel is within the ROI;
   measuring, for each fractional pixel within the ROI, an image characteristic of the pixel; and
   determining an overall image characteristic for the ROI based on the image characteristics.

13. The method of example 12 wherein determining a fractional pixel location of a center of the ROI comprises receiving user input specifying the center of the ROI.

14. The method of example 12 or example 13 wherein determining the radius of the ROI in pixels comprises determining the radius in a fractional number of pixels.

15. The method of any one of examples 12-14 wherein measuring, for each fractional pixel within the ROI, an image characteristic of the pixel comprises measuring luminance of each pixel located wholly within the bounds.

16. The method of any one of examples 12-14 wherein measuring, for each fractional pixel within the ROI, an image characteristic of the pixel comprises measuring a color value of each pixel located wholly within the bounds.

17. The method of any one of examples 12-14 wherein measuring, for each fractional pixel within the ROI, an image characteristic of the pixel comprises using bilinear interpolation of four surrounding pixels to determine the estimated image characteristic for the fractional pixel.

18. The method of any one of examples 12-17 wherein determining a number of fractional pixels to be sampled further comprises determining a fractional pixel sampling resolution and setting an increment size over which the ROI is to be sampled.

19. The method of example 18 wherein the fractional pixel sampling resolution is greater than 0 pixel and less than 1.0 pixel.

20. The method of any one of examples 12-19 wherein the center of the ROI is between pixels and not centered on an exact pixel.

D. Conclusion

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method in a computing system having an image capture device for measuring one or more characteristics of a region of interest (ROI) in an image captured by the image capture device, the image having an array of a number of pixels containing information about an electronic visual display that is separate from the image capture device, the method comprising:
    determining a fractional pixel location of a center of the ROI and at least one dimension of the ROI in pixels;
    determining a pixel location of bounds of the ROI based on the fractional pixel location of the center and the at least one dimension of the ROI;
    measuring, for each pixel located wholly within the bounds, a first image characteristic of the pixel;
    measuring, for each pixel partially within and partially outside the bounds, a second image characteristic of the pixel;
    scaling each second image characteristic; and
    determining an overall image characteristic for the ROI based at least on a summation of the first image characteristics and the scaled second image characteristics.

2. The method of claim 1, further comprising:
    determining an area of the ROI based on the at least one dimension of the ROI; and
    dividing the sum of the first image characteristics and the scaled second image characteristics by the area of the ROI to determine the overall image characteristic.

3. The method of claim 1 wherein scaling each second image characteristic includes scaling each second image characteristic by the percentage of the corresponding pixel that is within the ROI.

4. The method of claim 1 wherein the ROI is rectangular, and wherein the at least one dimension comprises a height and a width of the ROI.

5. The method of claim 1 wherein measuring, for each pixel located wholly within the bounds, a first image characteristic of the pixel comprises measuring luminance of each pixel located wholly within the bounds.

6. The method of claim 1 wherein measuring, for each pixel located wholly within the bounds, a first image characteristic of the pixel comprises measuring a color value of each pixel located wholly within the bounds.

7. The method of claim 1 wherein the ROI is circular, and wherein the at least one dimension is a radius.

8. The method of claim 1 wherein determining a fractional pixel location of a center of the ROI comprises:
    determining a center, a horizontal width, and a vertical height of the ROI in units of pixels; and
    using the center, horizontal width, and vertical height, determining a centroid of selected pixels within the ROI.

9. The method of claim 1 wherein determining a fractional pixel location of a center of the ROI comprises receiving user input specifying the center of the ROI.

10. The method of claim 1 wherein the electronic visual display comprises an organic light-emitting diode (OLED) display.

11. The method of claim 1, further comprising calibrating the electronic visual display based, at least in part, on the determined overall image characteristic for the ROI.

12. A method in a computing system in communication with an image capture device for measuring one or more characteristics of a circular region of interest (ROI) in an image captured by the image capture device, the image having an array of a number of pixels containing information about an electronic visual display that is separate from the image capture device, the method comprising:
    determining a fractional pixel location of a center of the ROI and the radius of the ROI in pixels;
    determining a number of fractional pixels to be sampled and the bounds of the ROI based on the radius and the fractional pixel location of the center of the ROI;
    determining, for each sampled fractional pixel, whether the fractional pixel is within the ROI;
    measuring, for each fractional pixel within the ROI, an image characteristic of the pixel; and
    determining an overall image characteristic for the ROI based on the image characteristics.

13. The method of claim 12 wherein determining a fractional pixel location of a center of the ROI comprises receiving user input specifying the center of the ROI.

14. The method of claim 12 wherein determining the radius of the ROI in pixels comprises determining the radius in a fractional number of pixels.

15. The method of claim 12 wherein measuring, for each fractional pixel within the ROI, an image characteristic of the pixel comprises measuring luminance of each pixel located wholly within the bounds.

16. The method of claim 12 wherein measuring, for each fractional pixel within the ROI, an image characteristic of the pixel comprises measuring a color value of each pixel located wholly within the bounds.

17. The method of claim 12 wherein measuring, for each fractional pixel within the ROI, an image characteristic of the pixel comprises using bilinear interpolation of four surrounding pixels to determine the estimated image characteristic for the fractional pixel.

18. The method of claim 12 wherein determining a number of fractional pixels to be sampled further comprises determining a fractional pixel sampling resolution and setting an increment size over which the ROI is to be sampled.

19. The method of claim 12 wherein the center of the ROI is between pixels and not centered on an exact pixel.

20. A method in a computing system communication with an image capture device for measuring one or more characteristics of a circular region of interest (ROI) in an image captured by the image capture device, the image having an array of a number of pixels containing information about an electronic visual display that is separate from the image capture device, the method comprising:
   determining a fractional pixel location of a center of the ROI and the radius of the ROI in pixels;
   determining a fractional pixel sampling resolution, wherein the fractional pixel sampling resolution is greater than 0 pixel and less than 1.0 pixel;
   determining a number of fractional pixels to be sampled and the bounds of the ROI based on the fractional pixel sampling resolution, the radius, and the fractional pixel location of the center of the ROI;
   determining, for each sampled fractional pixel, whether the fractional pixel is within the ROI;
   measuring, for each fractional pixel within the ROI, an image characteristic of the pixel; and
   determining an overall image characteristic for the ROI based on the image characteristics.

* * * * *

UNITED STATES PATENT AND TRADEMARK OFFICE
CERTIFICATE OF CORRECTION

| | |
|---|---|
| PATENT NO. | : 10,971,044 B2 |
| APPLICATION NO. | : 16/641405 |
| DATED | : April 6, 2021 |
| INVENTOR(S) | : Gary Robert Pedeville et al. |

It is certified that error appears in the above-identified patent and that said Letters Patent is hereby corrected as shown below:

In the Specification

In Column 10, Line 20, delete "of the of the" and insert -- of the --, therefor.

In the Claims

In Column 18, Line 1, in Claim 20, after "system" insert -- in --.

Signed and Sealed this
Seventeenth Day of May, 2022

*Katherine Kelly Vidal*

Katherine Kelly Vidal
*Director of the United States Patent and Trademark Office*